United States Patent

Gibbs et al.

[11] Patent Number: 5,963,441
[45] Date of Patent: Oct. 5, 1999

[54] ALTERNATING CURRENT RECTIFIER BRIDGE AND SYSTEM FOR MEASURING AVERAGE CURRENT PER BRIDGE SEGMENT

[75] Inventors: Irving A. Gibbs, Fletcher; C. Allan Morse; Rolando F. Martinez, both of Arden, all of N.C.

[73] Assignee: Eaton Corporation, Cleveland, Ohio

[21] Appl. No.: 09/146,690

[22] Filed: Sep. 3, 1998

[51] Int. Cl.[6] .................................................. H02M 7/155
[52] U.S. Cl. .............................. 363/87; 363/84; 363/128
[58] Field of Search ................................. 363/44, 78, 79, 363/81, 84, 87, 125, 128

[56] References Cited

U.S. PATENT DOCUMENTS

| | | | |
|---|---|---|---|
| 3,932,765 | 1/1976 | Townsend | 307/149 |
| 4,106,085 | 8/1978 | Demarest et al. | 363/51 |
| 4,253,054 | 2/1981 | Steigerwald | 320/129 |
| 4,475,150 | 10/1984 | D'Atre et al. | 363/51 |
| 5,343,079 | 8/1994 | Mohan et al. | 307/105 |
| 5,345,375 | 9/1994 | Mohan | 363/40 |
| 5,631,818 | 5/1997 | Johnson et al. | 363/126 |
| 5,638,265 | 6/1997 | Gabor | 363/89 |
| 5,796,601 | 8/1998 | Yamamoto | 363/84 |
| 5,847,944 | 12/1998 | Jang et al. | 363/44 |

*Primary Examiner*—Adolf Deneke Berhane
*Attorney, Agent, or Firm*—Martin J. Moran

[57] ABSTRACT

A three-phase controlled rectifier bridge for converting alternating current to direct current includes six segments for each of the positive and negative polarities of each of three AC phases. Each of the segments has a semiconductor controlled rectifier element responsive to a control signal to control current conduction within the segment. A conduction monitor, which is provided for each of the AC phases, monitors a corresponding one of the AC phases to provide a conduction monitor signal. A first shunt current sensor senses current of the segments for the positive polarity of the AC phases and provides a first current signal. A second shunt current sensor senses current of the segments for the negative polarity of the AC phases and provides a second current signal. A control and monitoring circuit has outputs which output the control signals to the segments to control current conduction within the segments, and a microprocessor-based firmware routine which employs the conduction monitor signals and the first and second current signals to determine an average current for each of the segments.

19 Claims, 13 Drawing Sheets

5,963,441

ALTERNATING CURRENT RECTIFIER BRIDGE AND SYSTEM FOR MEASURING AVERAGE CURRENT PER BRIDGE SEGMENT

BACKGROUND OF THE INVENTION

1. Field of the Invention

This invention pertains generally to rectifier circuits and, more particularly, to three-phase semiconductor controlled rectifier (SCR) bridges for converting alternating current (AC) to direct current (DC).

2. Background Information

Three-phase rectifier circuits are commonly employed to convert AC signals to DC. These circuits commonly use SCRs disposed in bridge segments, with typically one SCR for each polarity of each AC phase. The firing point for each rectifier in the cycle of the AC waveform is normally controlled by a bridge firing control circuit.

It is not uncommon for a number of bridges to be operated in parallel with each of the bridge firing control circuits being controlled by a central firing control circuit. The central firing control circuit manages each of the bridge firing control circuits in order that the corresponding rectifiers in each of the parallel bridges conduct current at the exact same point in the AC waveform.

It is desirable to have each of the SCRs in each corresponding segment of the several bridges fired at the exact same time to ensure the quality of the DC signal output and avoid the necessity for extensive filtering circuits. Unfortunately, even slight variations in the nature of the components can vary the resistance and inductance of the bridge segments, thereby affecting their outputs and resulting in some imbalance. This imbalance can further affect the heating of the various components in the different bridge segments and, thus, also affect the outputs.

Typically, average current values for each bridge segment are measured and employed by the control firing control circuit to balance the outputs of the parallel bridges. In prior art digital systems, where individual currents for each SCR are measured at specific times, it is possible to calculate any function of the current that each cell or segment carries (e.g., the average current) as determined from instantaneous currents as sensed by corresponding individual sensors for each of the respective bridge segments.

Accordingly, there is room for improvement in terms of an improved rectifier bridge and system for measuring average current per bridge segment.

SUMMARY OF THE INVENTION

The present invention employs first and second current sensors to sense the currents of the bridge segments for the positive and negative polarity of the alternating current (AC). Monitors are provided for each of the AC phases to provide conduction signals. In turn, a means employs the conduction signals and the first and second current signals to determine the average current for each of the bridge segments. In this manner, the count of current sensors to determine average cell currents is reduced.

As one aspect of the invention, a controlled rectifier bridge for converting alternating current to direct current includes a segment for each of the positive and negative polarities of each of the phases of the alternating current. Each of the segments has an element responsive to a control signal to control current conduction within the segment. A monitor for each of the phases of the alternating current monitors a corresponding one of the phases to provide a conduction signal. A first current sensor senses current of the segments for the positive polarity of the phases of the alternating current and provides a first current signal. A second current sensor senses current of the segments for the negative polarity of the phases of the alternating current and provides a second current signal. A means outputs the control signals to the segments to control current conduction within the segments. A means employs the conduction signals and the first and second current signals to determine an average current for each of the segments.

As another aspect of the invention, a system for converting alternating current to direct current includes a plurality of controlled rectifier bridges. Each of the bridges includes a segment for each of the positive and negative polarities of each of the phases of the alternating current. Each of the segments has an element responsive to a control signal to control current conduction within the segment. A monitor for each of the phases of the alternating current monitors a corresponding one of the phases to provide a conduction signal. A first current sensor senses current of the segments for the positive polarity of the phases of the alternating current and provides a first current signal. A second current sensor senses current of the segments for the negative polarity of the phases of the alternating current and provides a second current signal. A means outputs the control signals to the segments to control current conduction within the segments. A means employs the conduction signals and the first and second current signals to determine an average current for each of the segments. A central control circuit controls the rectifier bridges.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
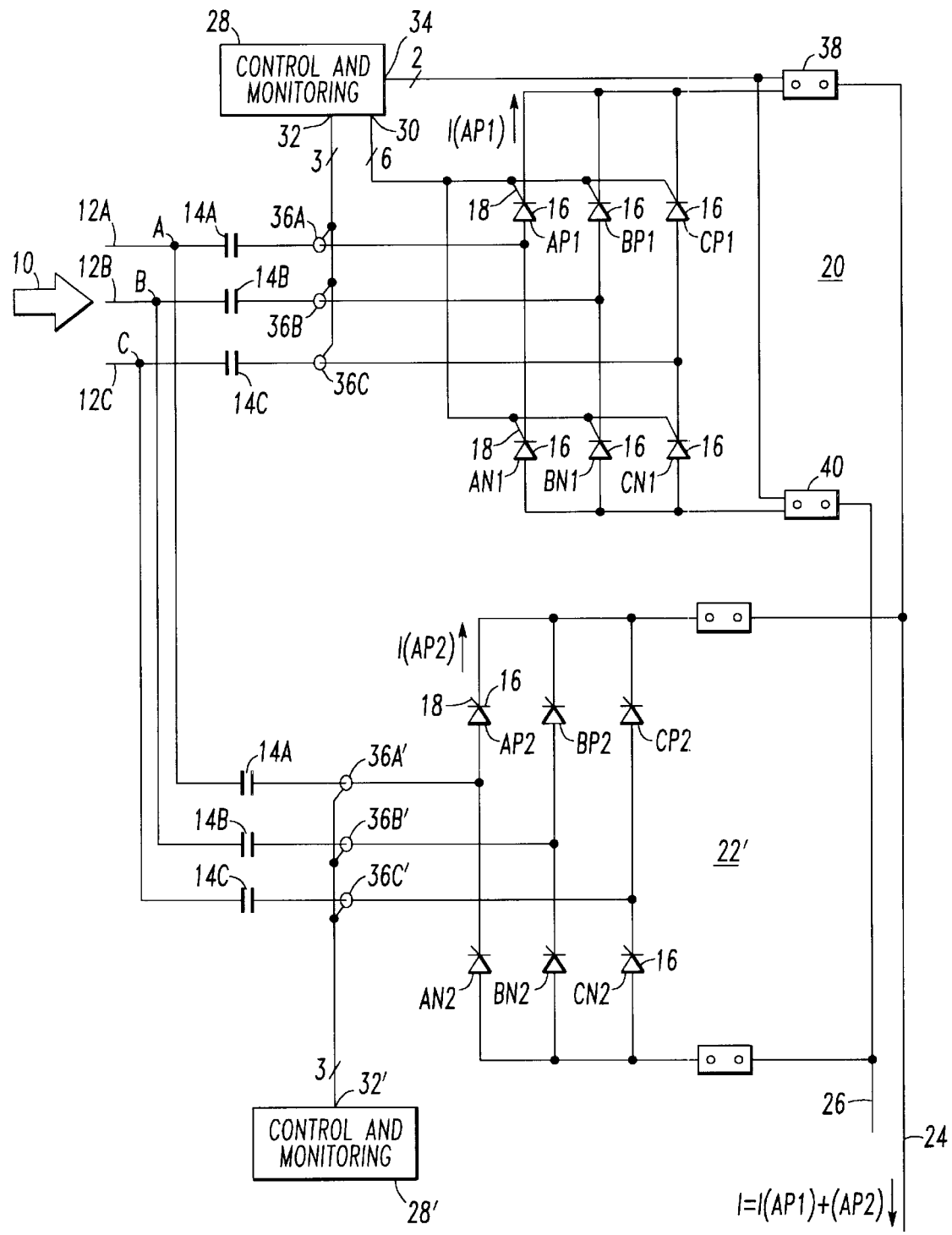
FIG. 1 is a circuit block diagram that shows two, three-phase, SCR bridges having an input from a common three-phase source and connected in parallel to provide an additive current output in accordance with the invention.

Bridges of semiconductor controlled rectifiers (SCRs) are generally employed to convert alternating (AC) sinusoidal signal waveforms to direct current (DC). As shown in FIG. 1, two controlled rectifier bridges 20,22' are connected in parallel. Each of the bridges 20,22' receives a multi-phase current input from a common AC source 10 (e.g., a motor generator, field transformer). A three-phase current input is employed in this example, although the invention is applicable to a wide range of phase counts. The several phases of input current, shown as 12A, 12B and 12C, are fed through contacts 14A, 14B and 14C, respectively, to rectifying segments on the two bridges 20,22'.

The exemplary bridges 20,22' each have six cells or segments, one for each polarity of each of the phase currents 12A,12B,12C, although the invention is applicable to a wide range of segment counts. For example, segment AP1 refers to the positive polarity of phase A in the first bridge 20, while segment AN1 refers to the negative polarity of phase A in that first bridge 20. The remaining segments of the first and second bridges 20,22' are noted in a similar manner by reference characters BP1,BN1,CP1,CN1 and AP2,AN2, BP2,BN2,CP2,CN2.

Each bridge segment includes its own element, such as the exemplary SCR 16, that has a firing input 18. When a suitable control signal is provided to one of the inputs 18, the corresponding SCR fires to, thereby, control current conduction (e.g., by starting or initiating current conduction) within the corresponding segment. Typically, the individual segments of each of the bridges 20,22' are fired every 60° of the AC cycle in the order: APn,CNn,BPn,ANn,CPn,BNn (where, for convenience of reference, APn, for example, refers to either AP1 or AP2). One of the SCRs 16 does not stop conducting until it is reversed biased. All of the positive rectifier output currents are summed together and the negative rectifier output currents are similarly summed and conveyed by corresponding positive and negative conductors 24,26 to a load (not shown).

An exemplary microprocessor-based control and monitoring circuit 28 has six control outputs 30, which are interconnected with the six firing inputs 18 of the SCRs 16, for outputting control signals to the segments AP1,BP1,CP1, AN1,BN1,CN1 to control current conduction within those segments, and five monitoring inputs, with three inputs at 32 and two inputs at 34. The six control outputs 30 include six digital logic control signals each of which controls current conduction within a corresponding one the segments. The circuit 28 employs a firing code that has six bits. Each of the six bits is set when a corresponding segment is to fire (e.g., bit 0 for APn, bit 1 for BPn, bit 2 for CPn, bit 3 for ANn, bit 4 for BNn, and bit 5 for CNn). Each time a firing occurs, two cells are fired. Also, a cell is usually fired a second time in order that the second firing occurs in the next subsequent firing (e.g., by first firing APn and CNn with the firing code=$100001_2$, followed by firing CNn and BPn with the firing code=$100010_2$). By ANDing the last two firing codes, it may readily be determined which cell has been consecutively fired (e.g., the first firing code of $100001_2$ ANDed with the second firing code=$100010_2$ provides the code= $100000_2$ which indicates that segment CNn was twice-fired).

Three monitors 36A,36B,36C provide three conduction monitor signals to the inputs 32 for the three AC phases A,B,C. The monitors 36A,36B,36C monitor the respective phases A,B,C to provide corresponding conduction signals. Preferably, the monitors 36A,36B,36C are conduction monitors which output conduction monitor signals as four-state logic signals having a first state (e.g., $10_2$) representative of the positive polarity of the AC input current 12A,12B,12C; a second state (e.g., $01_2$) representative of the negative polarity of the AC input current; a third state (e.g., $00_2$) representative of about zero AC input current; and a fourth state (e.g., $11_2$) representative of failure of the monitor.

Alternatively, as shown with the bridge 22', the conduction monitors 36A',36B',36C' are current sensing mechanisms, such as the exemplary current transformers, which output a first state (e.g., a first range of positive values) of the conduction signal representative of the positive polarity of the AC input current, and a second state (e.g., a second range of negative values) of the conduction signal representative of the negative polarity of the AC input current. In this embodiment, a control and monitoring circuit 28' inputs the three analog conduction signals at the three corresponding inputs 32', converts those analog inputs to plural-bit digital form (e.g., through a suitable n-bit analog-to-digital converter), and then converts the digital representation of the analog conduction signal to the first state (e.g., $10_2$, which is representative of positive AC input current), the second state (e.g., $01_2$, which is representative of negative AC input current), or the third state (e.g., $00_2$, which is representative of about zero AC input current plus or minus a suitable deadband). It will be appreciated that since the exemplary control and monitoring circuit 28 for bridge 20 employs four-state logic signals, and need not perform analog-to-digital conversions, that a simpler and more economical circuit is possible. It will be appreciated that a wide range of alternative conduction monitors may be employed (e.g., a current sensor, a shunt with a suitable isolation device to provide a suitable sensed current value).

As shown with the bridge 20, a first current sensor 38, such as a shunt, for the positive output of the bridge 20, senses current passing through the segments AP1,BP1,CP1 for the positive polarity of the AC phases A,B,C. Similarly, a second current sensor 40, such as a shunt, for the negative output of the bridge 20, senses current passing through the segments AN1,BN1,CN1 for the negative polarity of the AC phases A,B,C. In turn, the sensors 38,40 provide corresponding current signals to the two inputs 34 of the control and monitoring circuit 28. As discussed in greater detail below in connection with FIGS. 3, 4A-4B, 5A-5B, 6 and 7A-7B, the control and monitoring circuit 28 employs the three conduction monitor signals at inputs 32 along with the two current signals at inputs 34 to determine an average current for each of the segments AP1,BP1,CP1,ANl,BN1,CN1.

Figure 2A:
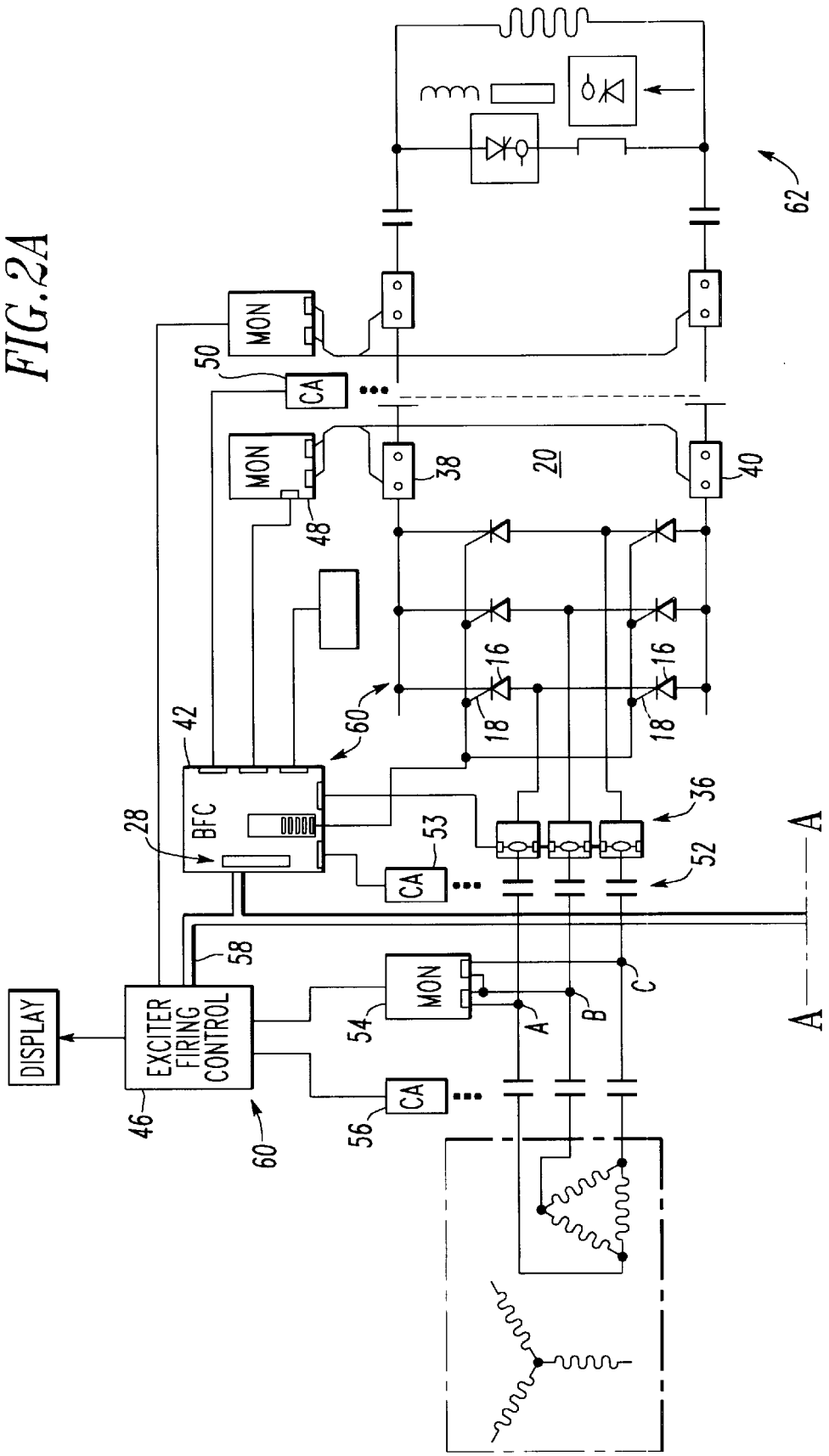
FIGS. 2A-2B are a circuit block diagram showing a parallel array of rectifier bridges, corresponding bridge firing control circuits and a central firing control circuit for developing the field current for an electrical generator in accordance with the invention.
Figure 2B:
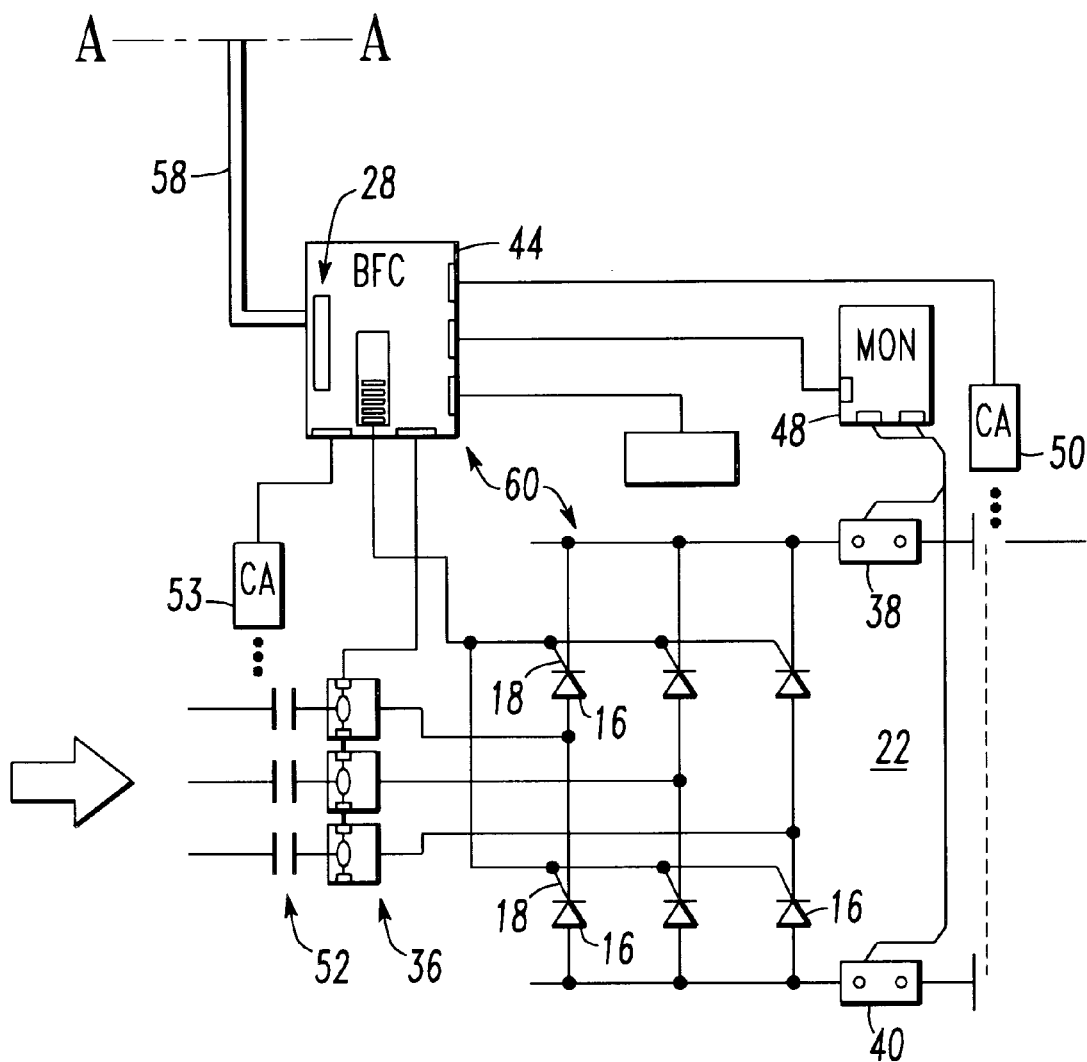

FIGS. 2A-2B show a similar parallel array of bridges 20,22, in which both bridges employ conduction monitors 36. Each of the bridges 20,22 has its own bridge firing control circuit (BFC) 42,44, respectively, which communicates with a central firing control circuit or exciter firing control (EFC) 46. Each of the BFCs 42,44 inputs conduction monitor signals from corresponding conduction monitors 36 (i.e., 36A,36B,36C of FIG. 1) which monitor phase current passing through phase contacts 52 to the SCRs 16. The BFCs 42,44 also input current signals from the shunts 38,40 through a current/voltage monitoring circuit 48 and use that information to control the output of the respective bridges 20,22 through DC contact actuators (CA) 50. The BFCs 42,44 also have the capability of controlling the AC input to the bridges 20,22, respectively, through AC contact actuators (CA) 53 which control the contacts 52.

The EFC 46 monitors the input voltage to the bridges 20,22 through monitoring circuit (MON) 54 and controls the AC inputs via AC contact actuator (CA) 56. The EFC 46 also communicates with the BFCs 42,44 over a communication bus 58. Although only two exemplary parallel bridges 20,22 shown, three or more of such bridges may employed. It will be appreciated that the EFC 46 controls and communicates with additional bridges in a similar manner. The exemplary bridges 20,22, BFCs 42,44 and EFC 46 form a system 60 for converting alternating current to direct current.

In a traditional analog control system, both SCRs AP1 and AP2 (as shown in FIG. 1) within corresponding segments of the respective bridges 20 and 20' are fired at very close to the same time. Ideally, line inductances and SCR cell characteristics for the parallel cells (or legs) are identical and the resulting currents, I(AP1) and I(AP2) (as shown in FIG. 1), are balanced. In practice, that does not always happen and, thus, an imbalance of the cell currents results.

By occasionally skipping (e.g., by not firing) an SCR associated with a given cell, which carries more than its average share of current, the average current per cell can be balanced. It is also possible to advance or retard the firing commands to individual SCRs in order to cause the cells in parallel cells of the different bridges to carry balanced currents, or to unbalance the currents as desired.

One method to accomplish advancing or retarding the firing control points of the SCRs is to use a digital balance counter at each of the BFCs 42,44. The SCR firing pulse is sent from the EFC 46 takes into account an additional delay at each bridge by the balance counter which will be started by the arrival of the firing signal. The balance counter is clocked at a known rate in all of the bridges. The local bridges vary the count at which each SCR fires, plus or minus one or more counts from the middle count, to adjust the current to the appropriate percentage of the total. The adjustment range is from a count of zero to the maximum count of the balance counter.

The SCR control method is referred to as "skip firing". It is a method used to control the current balance in parallel devices to obtain the desired effect. The basic principle is to control the average current of an element by "not firing" the element a controlled number of times or by varying the point at which the element fires. Because of the large inductance of the load 62 on the parallel bridges 20,22, establishing or controlling appropriate duty cycles for the individual bridges by skipping cycles or adjusting the cycles does not introduce appreciable disturbance in the load current. In turn, skip firing can be used to control the average current balance in parallel cells or can be used to unbalance a system to compensate for an element that is heating up.

The following description is one example of how skip firing can work to achieve the current balance between cells. As discussed below in connection with FIGS. 3, 4A-4B, 5A-5B, 6 and 7A-7B, the BFCs 42,44 determine the average current for each cell and send those results to the EFC 46. Although not shown, sensors, such as resistance temperature devices, may be employed to sense heat sink temperatures for the individual bridge segments associated with each SCR 16. Those temperatures may be recorded and, then, sent to the EFC 46. Algorithms in the EFC 46 calculate when and how often each cell in each bridge should not be fired or have its firing period advanced or retarded. In turn, the EFC 46 sends this information (i.e., the "skip firing code") over the communication bus 58 to the BFCs 42,44. Each of the BFCs 42,44 then skip fires based on the skip firing code (e.g., how many cycles to skip, how those cycles are to be distributed over a time interval, and how those skips are timed so as not to skip simultaneously the corresponding segment on any other bridge). The process continues with the collection of more data and subsequent modification to the skip firing code by the EFC 46.

Figure 3:
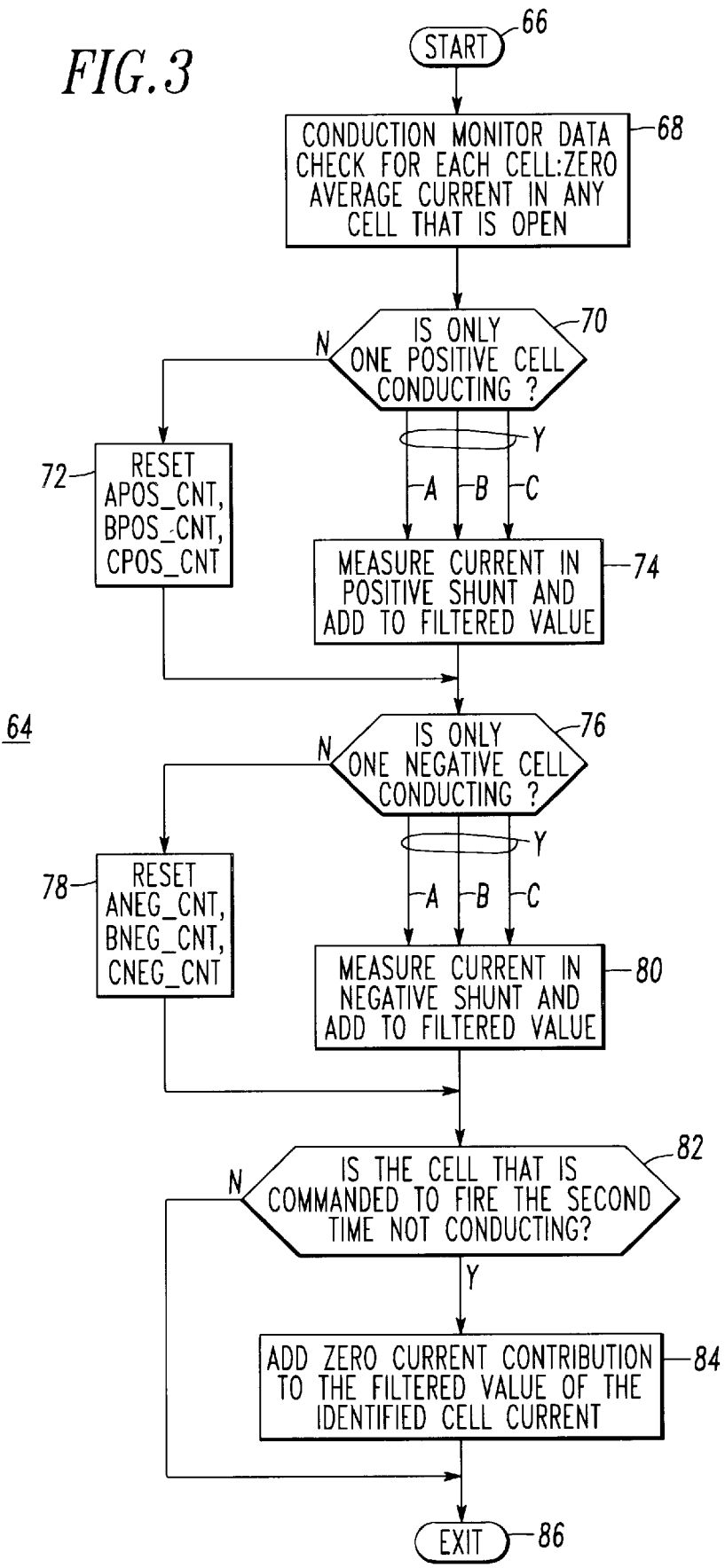
FIGS. 3, 4A-4B, 5A-5B, 6 and 7A-7B are flowcharts of firmware executed by the microprocessor of the bridge firing control circuits in accordance with the invention.

FIGS. 3, 4A-4B, 5A-5B, 6 and 7A-7B are flowcharts of firmware executed by the control and monitoring circuits 28 of the BFCs 42,44 to determine the average segment currents. Referring to FIG. 3, an interrupt routine 64 is periodically executed (e.g., without limitation, every 1 mS in the exemplary embodiment), although it will be appreciated that a wide range of periodic rates and equivalent a periodic implementations are possible. After starting, at 66, in response to a timer interrupt, a routine 68 (see FIGS. 4A-4B) checks conduction monitor data for each of the six cells APn,ANn,BPn,BNn,CPn,CNn and zeros the average current in any cell that is open. For example, if cell BPn is open, then the average cell current, IBP/, for that cell is set to zero.

At 70, it is determined whether only one positive cell (i.e., APn,BPn,CPn) is conducting by checking whether only one of the three inputs 32 for the conduction monitor signals has the positive state (e.g., $10_2$). If not (i.e., either no positive cell is conducting or, else, more than one positive cell is conducting), then, at 72, variables APOS_CNT, BPOS_CNT, and CPOS_CNT are reset to zero. Otherwise, at 74, since only one positive cell is conducting, the current signal for the positive shunt 38 is read from the corresponding input 34 and is suitably added to a filtered value to update the average current for that positive cell (see FIG. 5B). For example, if only positive cell CPn is conducting, then the positive shunt current, Ishunt_pos, is employed to update the old average cell current, ICP/, to provide the new average cell current, ICP/'.

At 76, it is determined whether only one negative cell (i.e., ANn,BNn,CNn) is conducting by checking whether only one of the three inputs 32 for the conduction monitor signals has the negative state (e.g., $01_2$). If not, then, at 78, since zero or more than one negative cell is conducting, variables ANEG_CNT, BNEG_CNT, and CNEG_CNT are reset to zero. Otherwise, at 80, since only one negative cell is conducting, the current signal for the negative shunt 40 is read from the corresponding input 34 and is suitably added to a filtered value to update the average current for that negative cell (see FIG. 6). For example, if only negative cell ANn is conducting, then the negative shunt current, Ishunt_neg, is employed to update the old average cell current, IAN/, to provide the new average cell current, IAN/'.

At 82, which is discussed in greater detail below in connection with FIG. 7A, the last two firing codes are compared to determine which one of the cells was commanded to fire a second time. For example, as discussed above in connection with FIG. 2A, the last two firing codes are ANDed to determine which bit of the firing code is set and, thus, which segment was commanded to fire the second time. For example, firing code=$100001_2$ ANDed with firing code=$100010_2$ determines that bit 5 is set and, thus, segment CNn was commanded to fire the second time. Then, it is determined whether the conduction signal which corresponds to the control signal for the twice-fired segment is in the non-conducting state. For example, if (1) the conduction signal corresponding to the exemplary twice-fired negative segment CNn for phase C is in the negative conducting state (e.g., $01_2$) or if (2) no cell was commanded to fire two times, then execution resumes at 86. In this event, either the cell which was commanded to fire two times is conducting or, else, no cell was commanded to fire two times. Otherwise, if that conduction signal is in the non-conducting or positive conducting states (e.g., $00_2$ or $10_2$, respectively), then execution resumes at 84.

Figure 7A:
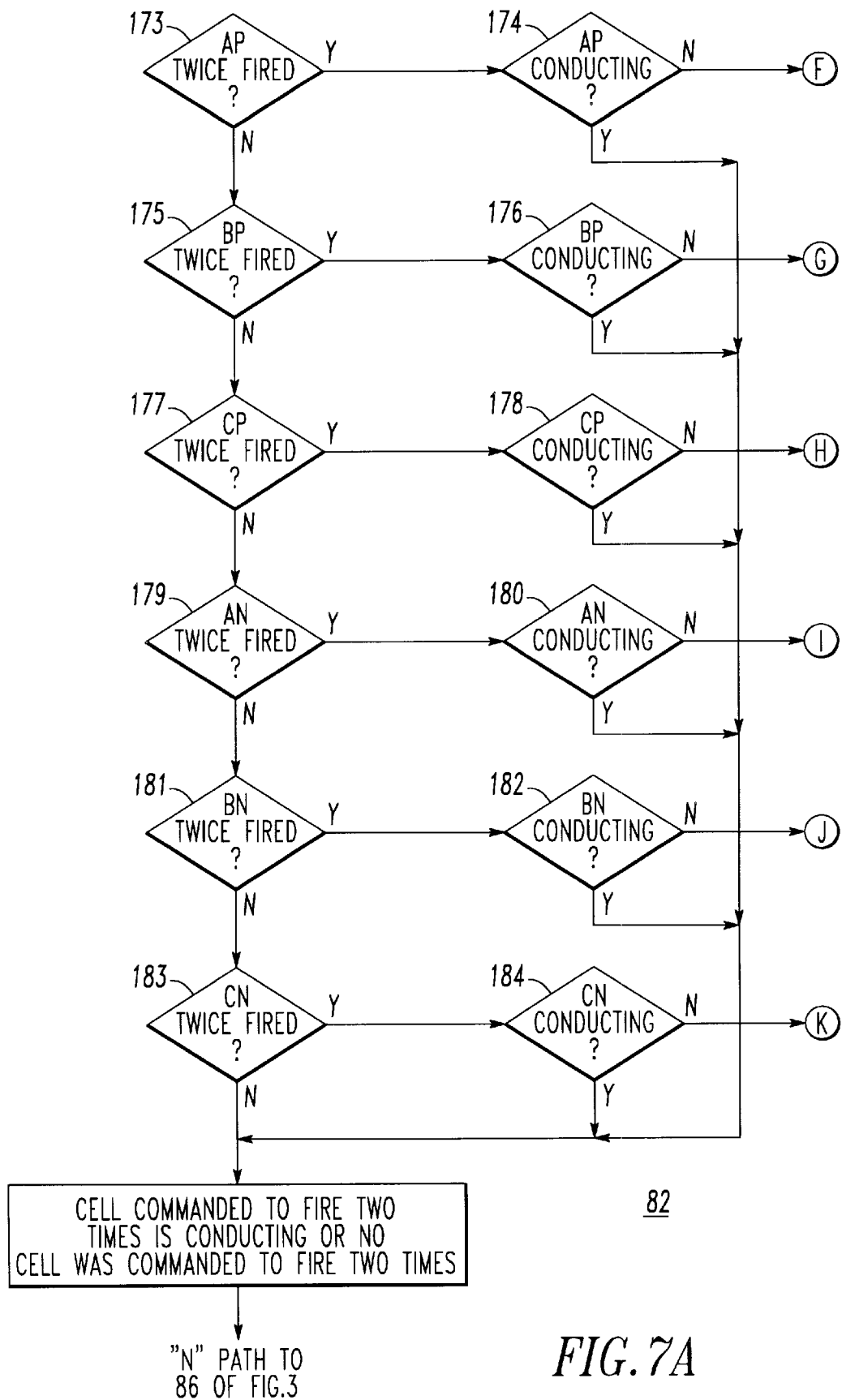
Figure 7B:
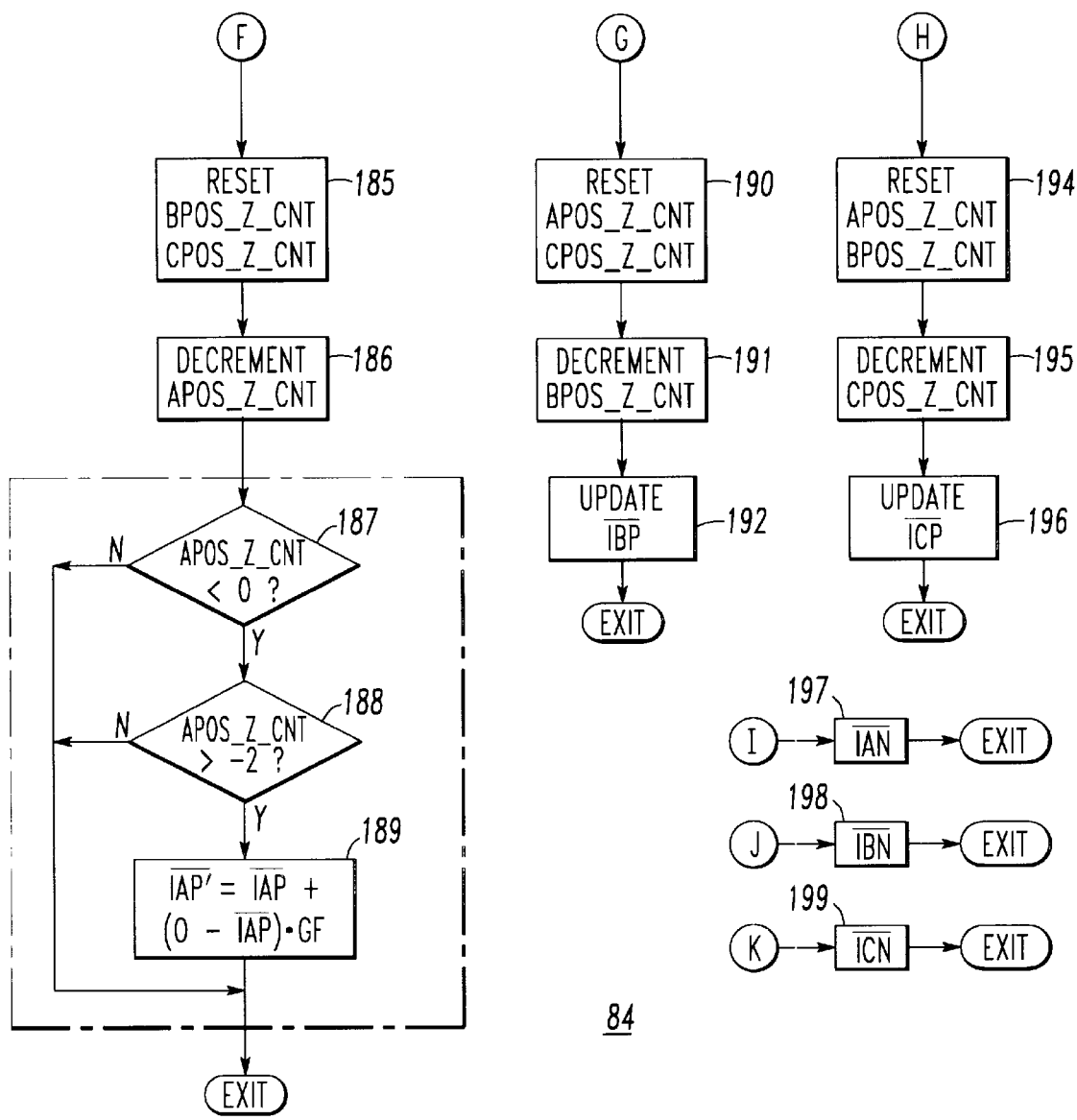

At 84, since it was determined that the twice-fired cell is not conducting, a zero current is suitably added to a filtered value to update the average current for that cell (see FIG. 7B). For the example where negative cell CNn is the twice-fired cell and is not conducting, a zero current is employed to update the old average cell current, ICN/, and provide the new average cell current, ICN/'. At 86, the interrupt routine 64 returns. It will be appreciated that such a non-conducting state might occur, for example, as a result of an intermittent failure of an SCR, substantial vibration of the SCR circuit, or as a result of "skip firing". In any event, step 84 advantageously adjusts the average cell current to account for that condition.

Figure 4A:
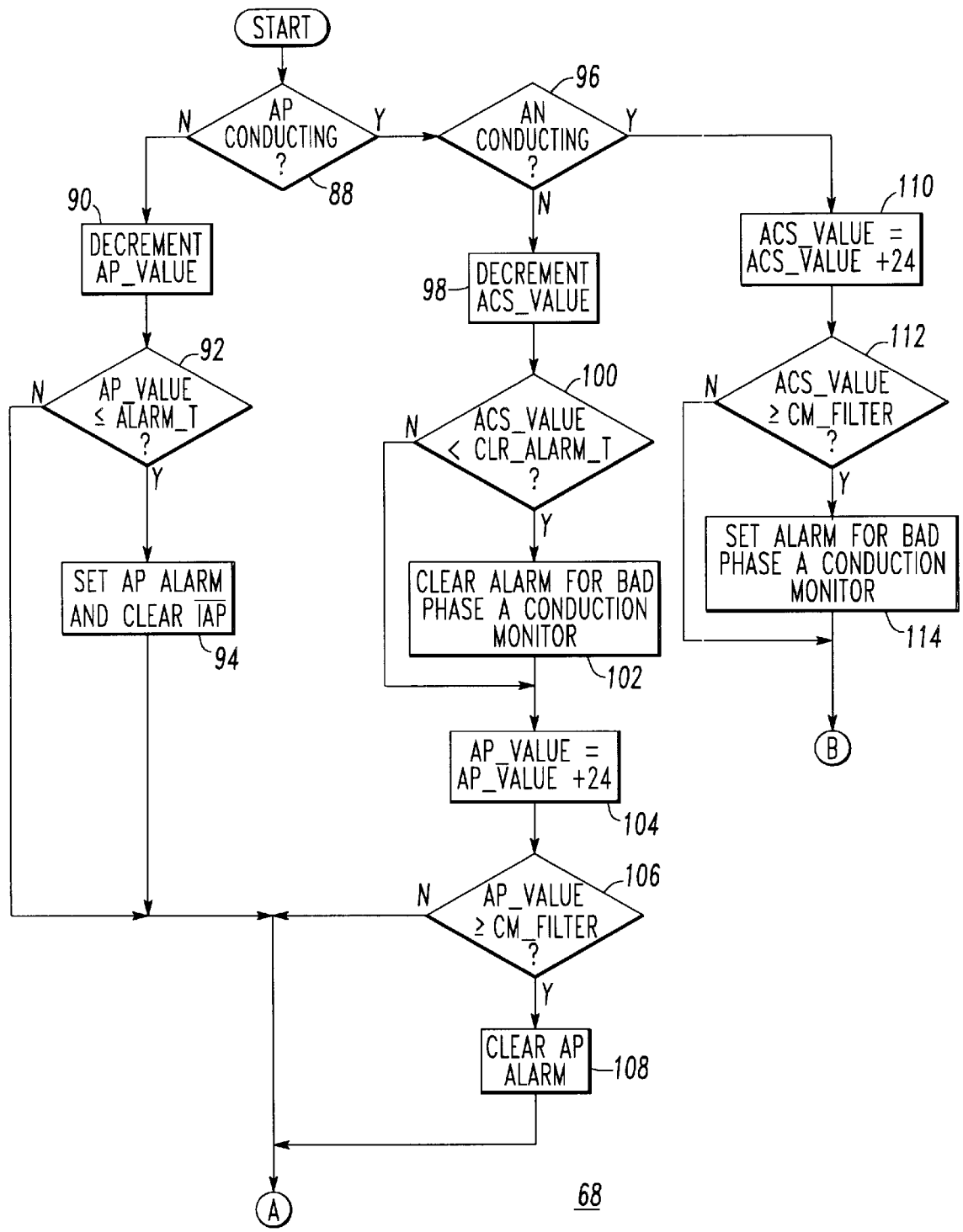
Figure 4B:
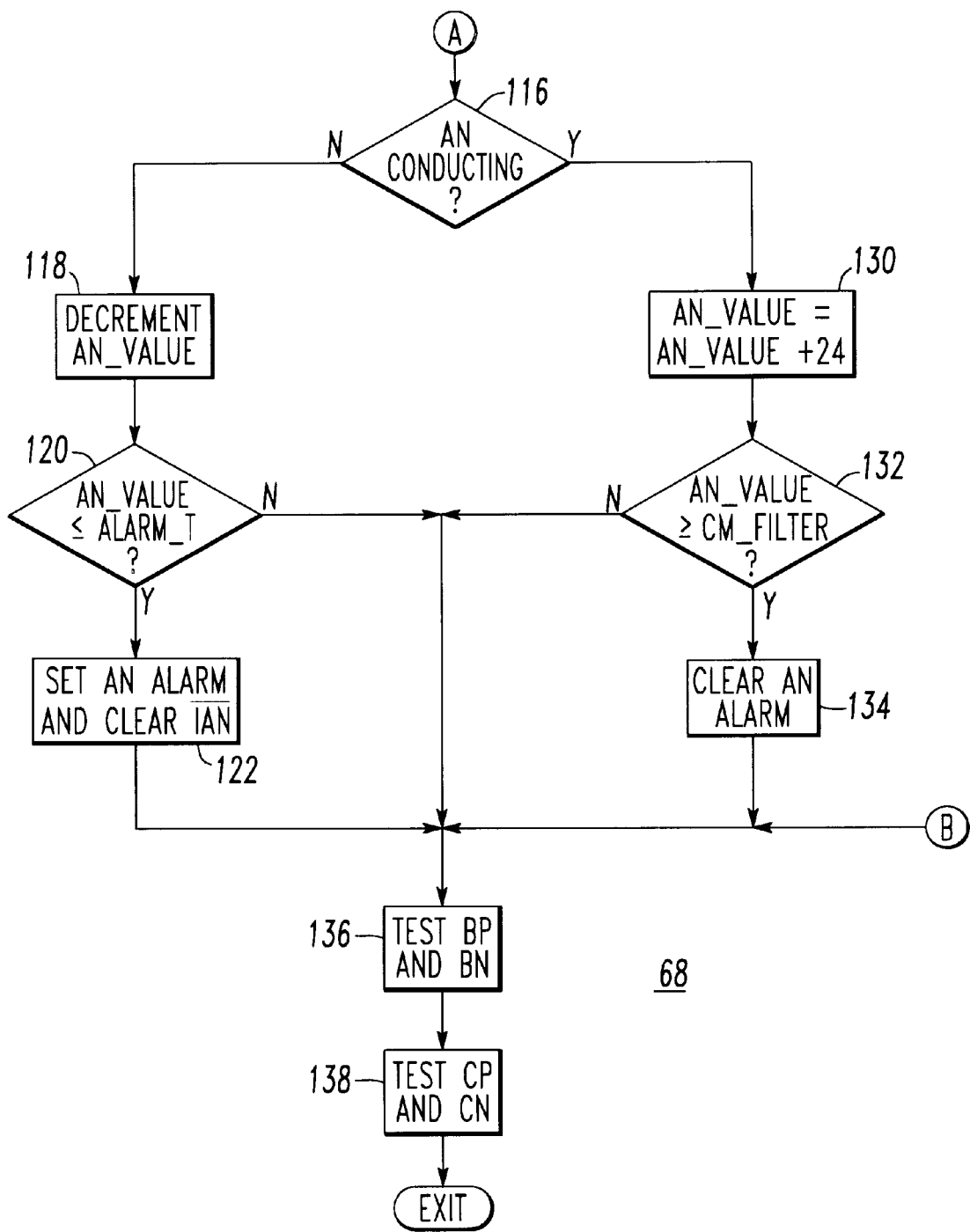

FIGS. 4A–4B show the routine 68 of FIG. 3. First, at 88, it is determined whether segment AP is conducting (for convenience of reference, AP is used in place of APn) by checking if the corresponding phase A conduction monitor signal at the inputs 32 has the positive state (e.g., $10_2$). If not, at 90, variable AP_VALUE is decremented. At 92, if variable AP_VALUE is less than or equal to alarm threshold value ALARM_T, then, at 94, an alarm for segment AP is set and the average current value, IAP/, is cleared. After 94, or if variable AP_VALUE is greater than the alarm threshold value ALARM_T at 92, execution resumes at 116 of FIG. 4B.

On the other hand, if AP is conducting, then, at 96, it is determined whether segment AN is conducting by checking if the corresponding phase A conduction monitor signal at the inputs 32 has the negative state (e.g., $01_2$). If not, at 98, variable ACS_VALUE is decremented. At 100, if variable ACS_VALUE is less than a clear alarm threshold value CLR_ALARM_T, then, at 102, an alarm for a bad phase A conduction monitor is cleared. Otherwise, if variable ACS_VALUE is greater than or equal to the clear alarm threshold value CLR_ALARM_T, or after 102, at 104, an exemplary count of 24 is added to the variable AP_VALUE. Next, at 106, if variable AP_VALUE is greater than or equal to a conduction monitor filter variable CM_FILTER, then, at 108, the alarm for segment AP is cleared. After 108, or if variable AP_VALUE is less than the conduction monitor filter variable CM_FILTER at 106, then execution resumes at 116 of FIG. 4B.

If steps 88 and 96 both indicate that segments AP and AN are conducting, which is an error condition, then, at 110, a count of 24 is added to variable ACS_VALUE. Each of the conduction signals for the three phases A,B,C corresponds to a pair of the control signals for the segments. For example, the conduction signal for phase A corresponds to the pair of control signals for the segments AP and AN. That phase A conduction signal has a positive state (e.g., $10_2$) representative of the positive polarity of the alternating current and a negative state (e.g., $01_2$) representative of the negative polarity of the alternating current. Thus, a value of $10_2$ at step 88 and a value of $01_2$ at step 96 is an error condition. At 112, if variable ACS_VALUE is greater than or equal to the conduction monitor filter variable CM_FILTER, then, at 114, the alarm for the bad phase A conduction monitor is set. After 114, or if variable ACS_VALUE is less than the conduction monitor filter variable CM_FILTER at 112, then execution resumes at 136 of FIG. 4B.

At 116 of FIG. 4B, it is determined whether segment AN is conducting as discussed above in connection with 96 of FIG. 4A. If not, at 118, variable AN_VALUE is decremented. At 120, if variable AN_VALUE is less than or equal to alarm threshold value ALARM_T, then, at 122, an alarm for segment AN is set and the average current value, IAN/, is cleared. After 122, or if variable AN_VALUE is greater than alarm threshold value ALARM_T at 120, execution resumes at 136.

On the other hand, if segment AN is conducting at 116, then, at 130, an exemplary count of 24 is added to the variable AN_VALUE. Next, at 132, if variable AN_VALUE is greater than or equal to the conduction monitor filter variable CM_FILTER, then, at 134, the alarm for segment AN is cleared. After 134, or if variable AN_VALUE is less than the conduction monitor filter variable CM_FILTER at 132, then execution resumes at 136.

At step 136, the conduction monitor data for segments BP and BN are checked and the average current (IBP/ and IBN/, respectively) is zeroed for any cell that is open in a like manner as discussed above in connection with even steps 88–122 and 130–134 for segments AP and AN. At step 138, in a like manner as step 136, the conduction monitor data for segments CP and CN are checked and the average current (ICP/ and ICN/, respectively) is zeroed for any cell that is open.

Figure 5A:
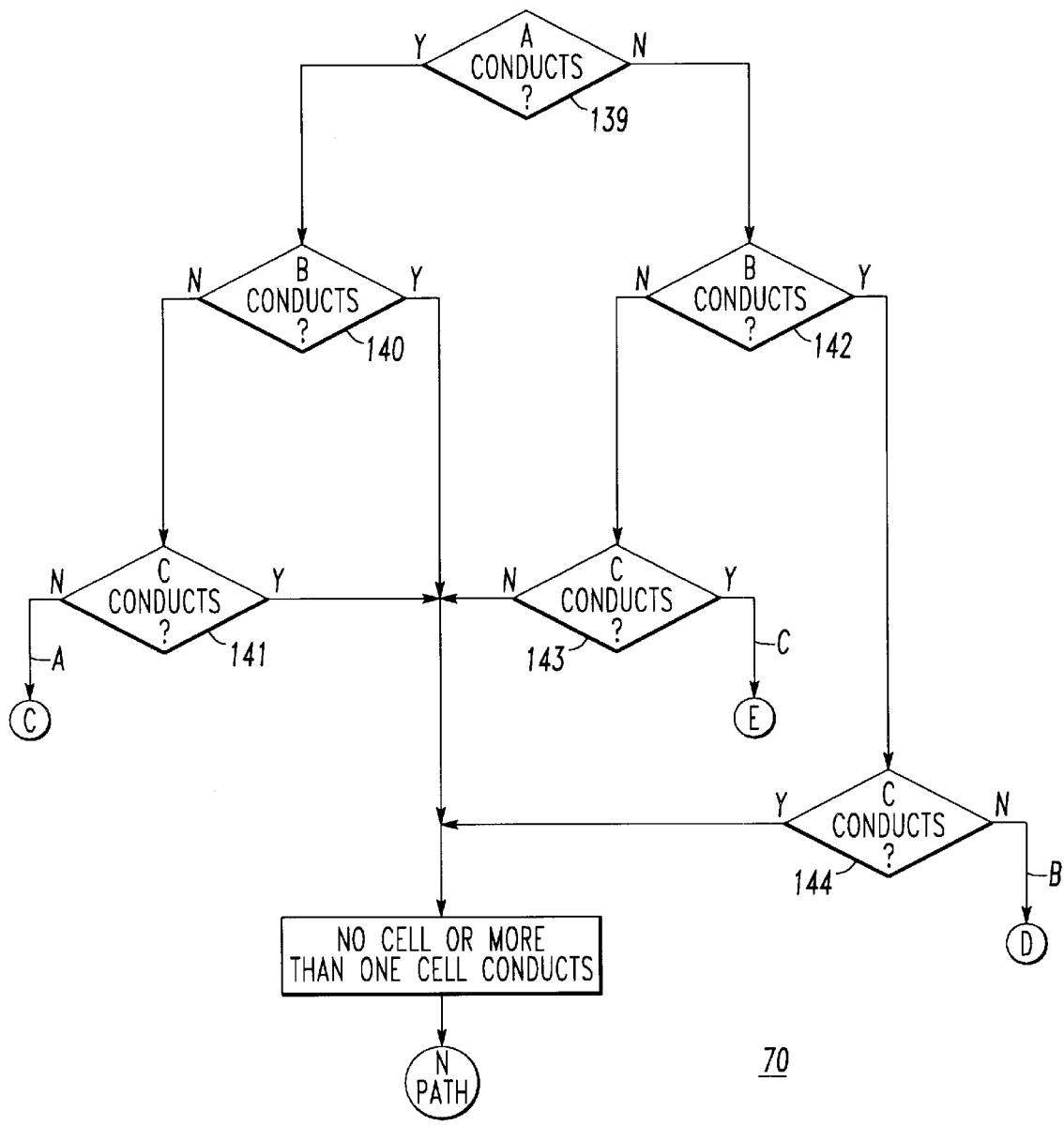
Figure 5B:
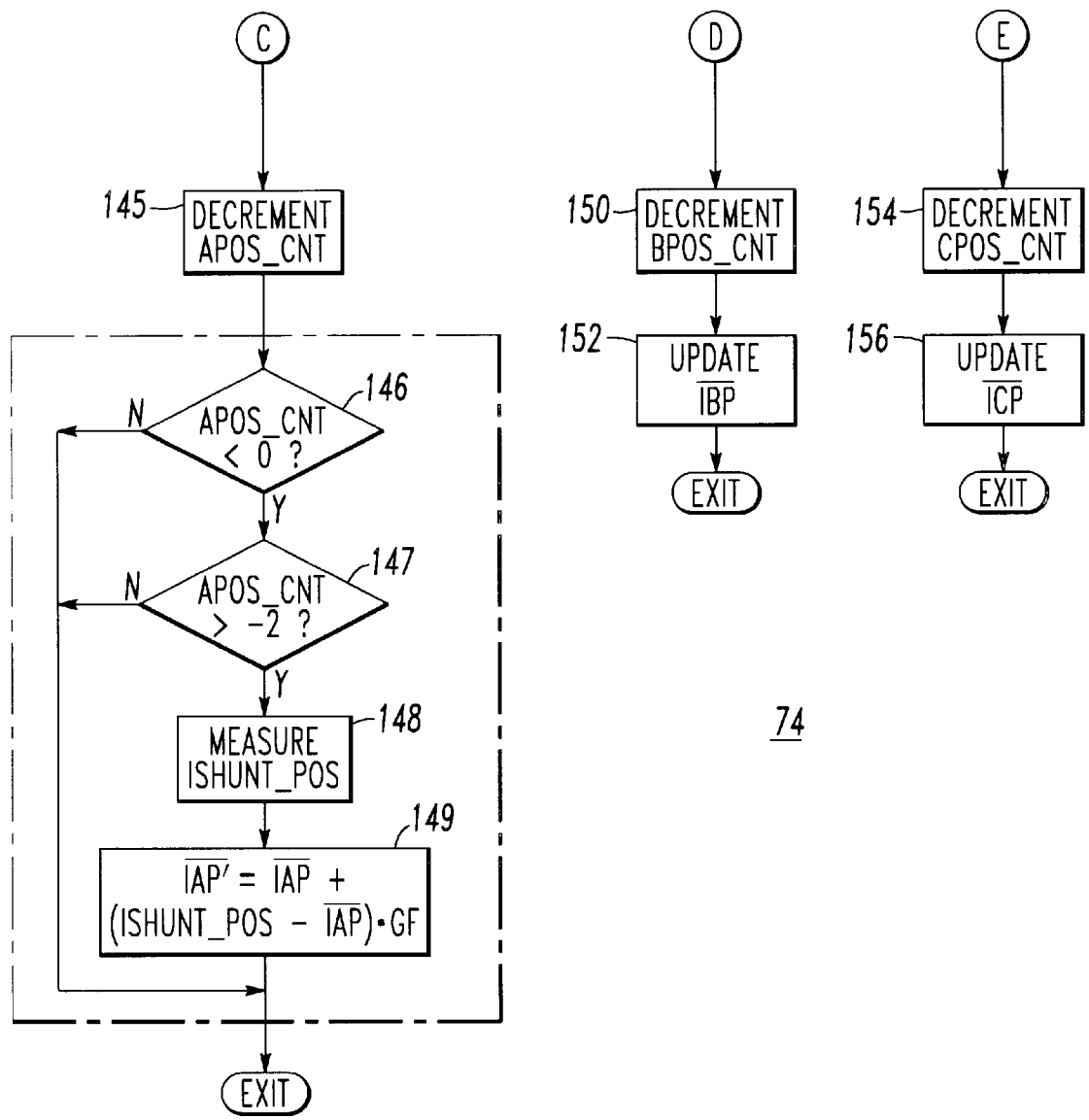

Referring to FIGS. 5A and 5B, the routines 70 and 74 of FIG. 3 are respectively illustrated. At 139, it is determined whether segment "A" is conducting (for convenience of reference in FIG. 5A, "A", "B" and "C" are used in place of "AP", "BP" and "CP", respectively, since FIG. 5A is logically applicable to the negative segments) by checking if the corresponding phase A conduction monitor signal at the inputs 32 has the positive state (e.g., $10_2$ for segment AP) or the negative state (e.g., $01_2$ for segment AN). If so, then, at 140, it is determined whether segment "B" is conducting by checking if the corresponding phase B conduction monitor signal at the inputs 32 has the positive state (e.g., $10_2$ for segment BP) or the negative state (e.g., $01_2$ for segment BN). If so, then more than one cell is conducting, and execution resumes at step 72 of FIG. 3 (or step 78 of FIG. 3 for negative segments). If segment B is not conducting at 140, then, at 141, it is determined whether segment "C" is conducting by checking if the corresponding phase C conduction monitor signal at the inputs 32 has the positive state (e.g., $10_2$ for segment CP) or the negative state (e.g., $01_2$ for segment CN). If so, then more than one cell is conducting, and execution resumes at step 72 of FIG. 3 (or step 78 of FIG. 3 for negative segments). If not, then only segment A is conducting and execution resumes at step 145 of FIG. 5B (or step 160 of FIG. 6 for negative segments).

If segment A is not conducting, then, at 142, it is determined whether segment "B" is conducting in the same manner as at step 140. If segment B is not conducting at 142, then, at 143, it is determined whether segment "C" is conducting in the same manner as at step 141. If segment C is not conducting at 143, then no cell is conducting and execution resumes at step 72 of FIG. 3 (or step 78 of FIG. 3 for negative segments). On the other hand, if segment C is conducting, then only segment C is conducting and execution resumes at step 154 of FIG. 5B (or step 171 of FIG. 6 for negative segments).

If segment B is conducting at 142, then, at 144, it is determined whether segment "C" is conducting in the same manner as at step 141. If segment C is not conducting at 144, then only segment B is conducting and execution resumes at step 150 of FIG. 5B (or step 169 of FIG. 6 for negative segments). Otherwise, more than one cell is conducting, and execution resumes at step 72 of FIG. 3 (or step 78 of FIG. 3 for negative segments).

If segment AP is conducting as discussed above in connection with 141 ("N" path) of FIG. 5A, then, as 145, variable APOS_CNT is decremented. Then, at 146 and 147, if it is determined that the variable APOS_CNT is equal to −1, then, at 148, the positive shunt current, Ishunt_pos, is read from shunt 38. Next, at 149, the old average cell current, IAP/, is subtracting from the positive shunt current to provide a difference value which is, then, multiplied by a gain factor value, GF (e.g., 0<GF<2) to provide an adjustment value which is, then, added to the old average cell current, IAP/, to provide the new value of the average cell current, IAP/'. In the exemplary embodiment, the gain factor value is selected to provide about a 0.5 S time constant for adjustment of the average cell current, although, as indicated above, a wide range of gain factors are possible.

In the exemplary embodiment, a voltage controlled oscillator (VCO) is employed to integrate the positive shunt current, Ishunt_pos, for one sample period. Steps 70, 72 and 74 of FIG. 3 (and steps 145–147 of FIG. 5B) are employed to ensure that the positive cell AP has been conducting for more than one sample and, hence, that the measurement of the positive shunt current consists of only the current for segment AP.

If positive segment BP is conducting as determined at 144 ("N" path) of FIG. 5A, then, at 150, variable BPOS_CNT is decremented, after which the old average cell current, IBP/, is updated, at 152, to provide the new value of the average cell current, IBP/', in a like manner as discussed in connection with steps 146–149 for segment AP.

If positive segment CP is conducting as determined at 143 ("Y" path) of FIG. 5A, then, at 154, variable CPOS_CNT is decremented, after which the old average cell current, ICP/, is updated, at 156, to provide the new value of the average cell current, ICP/', in a like manner as discussed in connection with steps 146–149 for segment AP.

Figure 6:
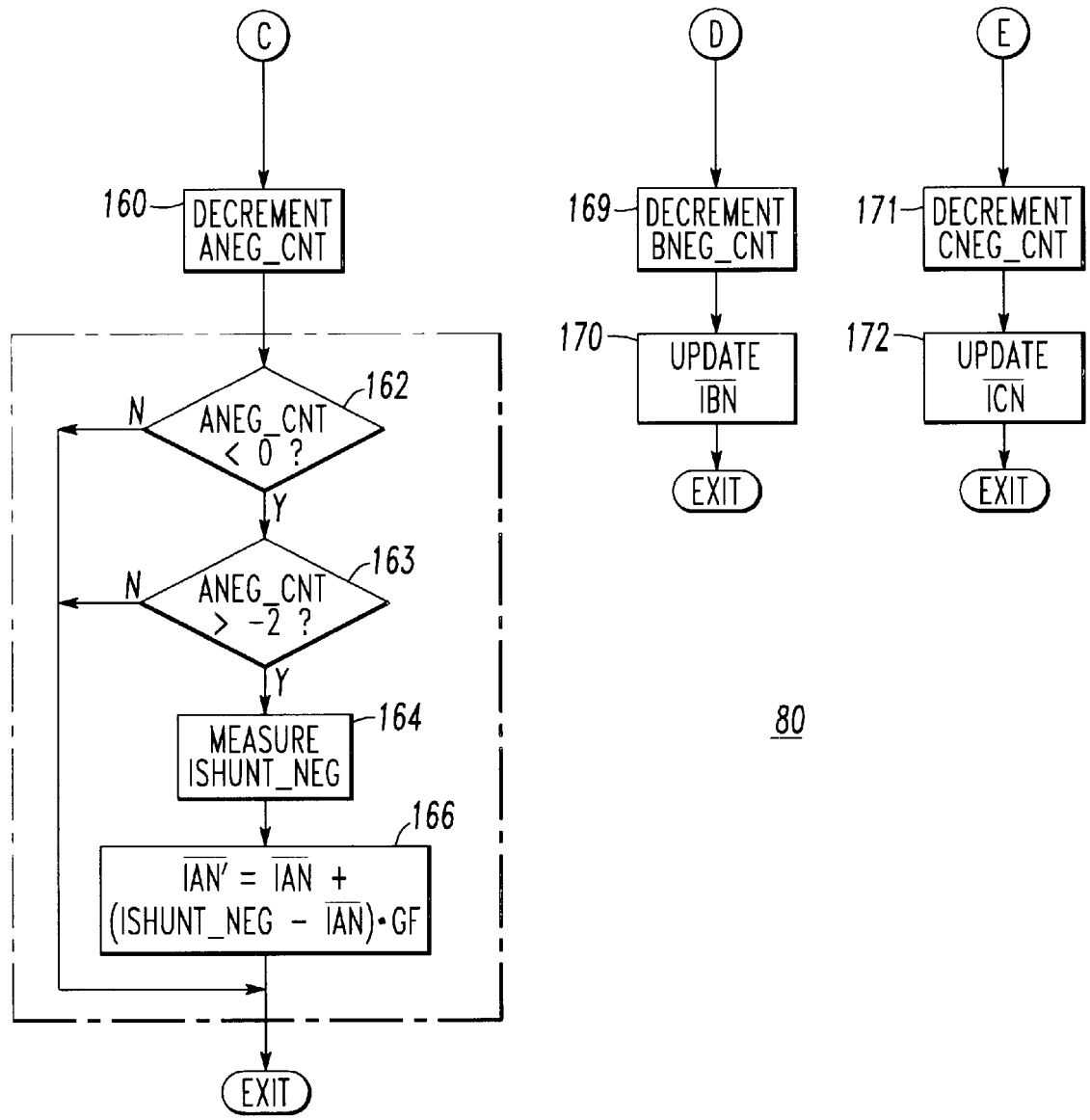

Referring to FIG. 6, the routine 80 of FIG. 3 is illustrated. If segment AN is conducting (as discussed above in connection with 141 ("N" path) of FIG. 5A), then, at 160, variable ANEG_CNT is decremented. Then, at 162 and 163, if it is determined that the variable ANEG_CNT is equal to −1, then, at 164, the negative shunt current, Ishunt_neg, is read from shunt 40. Next, at 166, the old average cell current, IAN/, is subtracting from the negative shunt current to provide a difference value which is, then, multiplied by the gain factor value, GF, to provide an adjustment value which is, then, added to the old average cell current, IAN/, to provide the new value of the average cell current, IAN/'.

Since a VCO is also employed to integrate the negative shunt current, Ishunt_neg, for one sample period, steps 76, 78 and 80 of FIG. 3 (and steps 160 and 162-163 of FIG. 6) are employed to ensure that the negative cell AN has been conducting for more than one sample and, hence, that the measurement of the negative shunt current consists of only the current for segment AN.

If negative segment BN is conducting (as discussed above in connection with 144 ("N" path of FIG. 5A)), then, at 169, variable BNEG_CNT is decremented, after which the old average cell current, IBN/, is updated, at 170, to provide the new value of the average cell current, IBN/', in a like manner as discussed in connection with steps 162–164 and 166 for segment AN.

If negative segment CN is conducting (as discussed above in connection with 143 ("Y" path of FIG. 5A)), then, at 171, variable CNEG_CNT is decremented, after which the old average cell current, ICN/, is updated, at 172, to provide the new value of the average cell current, ICN/', in a like manner as discussed in connection with steps 162–164 and 166 for segment AN.

Referring to FIGS. 7A and 7B, the routines 82 and 84, respectively, of FIG. 3 are illustrated. At 173, it is determined whether cell AP has been twice-fired. If not, then execution resumes at step 175. On the other hand, if cell AP has been twice-fired, then, at 174, it is determined whether cell AP is conducting by checking if the corresponding phase A conduction monitor signal at the inputs 32 has the positive state (e.g., $10_2$). If not, then cell AP has been twice-fired but is not conducting, and execution resumes at step 185 of FIG. 7B. If so, then cell AP has been twice-fired and is conducting, and execution resumes at step 86 of FIG. 3. Steps 175-176, 177-178, 179-180, 181-182 and 183-184 similarly determine whether cells BP, CP, AN, BN and CN, respectively, have been twice-fired but are not conducting. If any of cells BP, CP, AN, BN and CN have been twice-fired but are not conducting, then execution resumes at 190, 194, 197, 198 and 199, respectively, of FIG. 7B. Otherwise, if any of the cells has been twice-fired and is conducting, or if none of the cells has been twice-fired, then execution resumes at step 86 of FIG. 3.

Steps 173,175,177,179,181,183 compare the last two firing codes with a suitable mask for the cell. For example, if the next to last firing code was, for example, $100001_2$ (e.g., firing cell AP and cell CN), and if the last firing code was, for example, $100010_2$ (e.g., firing cell CN and cell BP), by ANDing the last two firing codes with the mask for cell CN (e.g., $100000_2$) to obtain the non-zero result $100000_2$, it may readily be determined, at step 183, that cell CN has been consecutively fired. In this example, step 181 would determine, by ANDing the last two firing codes with the mask for cell BN (e.g., $010000_2$) to obtain a zero result $000000_2$, that cell BN was not consecutively fired. It will appreciated that similar tests may be employed at steps 173, 175, 177 and 179 for the other cells.

Referring to FIG. 7B, if twice-fired cell AP is not conducting, then, at 185, variables BPOS_Z_CNT and CPOS_Z_CNT are zeroed and, at 186, variable APOS_Z_CNT is decremented. Then, at 187 and 188, if it is determined that the variable APOS_Z_CNT is equal to −1, then, at 189, the old average cell current, IAP/, is subtracting from zero to provide a difference value which is, then, multiplied by the gain factor value, GF, to provide an adjustment value which is, then, added to the old average cell current, IAP/, to provide the new value of the average cell current, IAP/'.

If twice-fired cell BP is not conducting, then, at 190, variables APOS_Z_CNT and CPOS_Z_CNT are zeroed and, at 191, variable BPOS_Z_CNT is decremented. Then, at 192, the old average cell current, IBP/, is updated to provide the new value of the average cell current, IBP/', in a like manner as discussed in connection with steps 187–189 for segment AP.

If twice-fired cell CP is not conducting, then, at 194, variables APOS_Z_CNT and BPOS_Z_CNT are zeroed and, at 195, variable CPOS_Z_CNT is decremented. Then, at 196, the old average cell current, ICP/, is updated to provide the new value of the average cell current, ICPI', in a like manner as discussed in connection with steps 187–189 for segment AP.

Similarly, at steps 197, 198 and 199, if twice-fired cells AN, BN and CN, respectively, are not conducting, then the appropriate one of the old average cell currents, IAN/, IBN/, ICN/, is updated to provide the corresponding one of the new values of the average cell currents, IAN/', IBN/', ICN/', respectively, in a like manner as discussed in connection with steps 185–189; 190–192; and 194–196 for positive segments AP, BP and CP, respectively.

Since a VCO is employed to integrate the shunt currents, Ishunt_pos and Ishunt_neg, for one sample period, steps 185–189; 190–192; and 194–196 are employed to ensure that the average is taken on a consistent number of samples.

Figure 8:
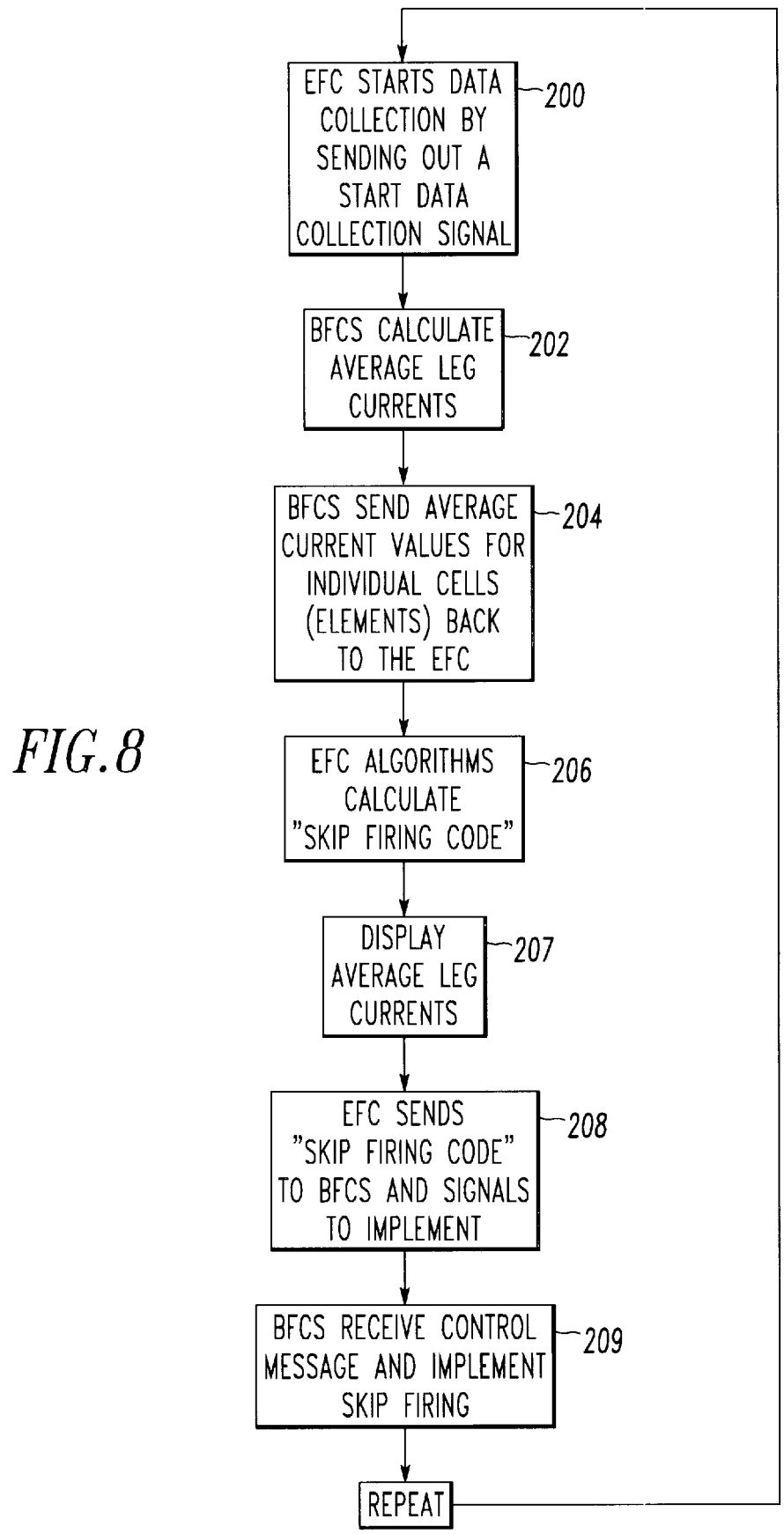
FIG. 8 is a logic flow diagram which shows a data communication scheme for skip firing.

A flow diagram showing the data interchange between the BFCs 42,44 and the EFC 46 is illustrated in FIG. 8. The EFC 46 starts data collection from the BFCs 42,44 by sending out a start data collection signal at 200. In response to the start data collection signal, the BFCs 42,44 collect shunt current values and calculate the average cell currents for a predetermined time period at 202. At 204, the average cell currents are then sent to the EFC 46 which receives and uses, at 206, the average cell current information to detect an imbalance in current among corresponding segments of the controlled rectifier bridges 20,22 and to calculate the skip firing code, which is described below in connection with FIG. 9. At 207, the EFC 46 outputs the average cell currents for display. Next, at 208, the EFC 46 then sends the skip firing code to each of the BFCs 42,44 with an appropriate signal to implement the firing cycle. Then, at 209, the BFCs 42,44 receive the control message and the selected BFC adjusts current conduction in one of its elements, which exhibits the imbalance, in order to cause the element conducting the larger current in the corresponding segment to skip a cycle of current conduction in a manner that will bring the segments into balance. The process is continually repeated during operation of the parallel bridge assembly.

Figure 9:
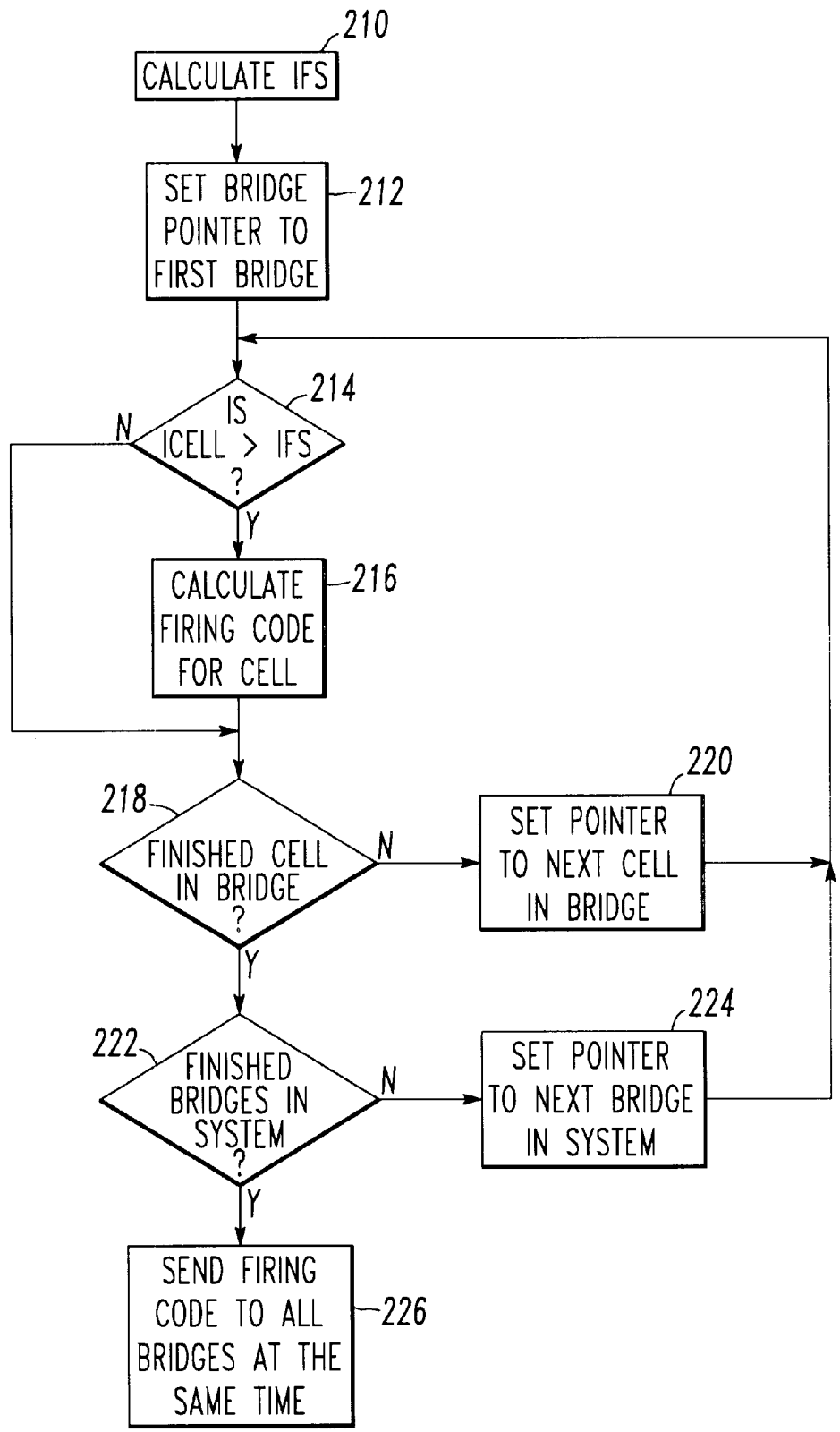
FIG. 9 is a logic flow diagram which shows the process employed for generating the skip firing code.

FIG. 9 illustrates a flow diagram representative of the process that the EFC 46 employs to generate the skip firing code. At 210, a fair share cell current (Ifs) is determined by dividing the total output current by the number of bridges. Then, at 212, the EFC 46 sets a pointer to the first bridge (e.g., 20) and determines, at 214, whether the average cell current (Icell) is greater than the fair share current, Ifs. If so, from that information, the EFC 46 calculates the skip firing code for that cell at 216. The skip firing code in this example is a 32–40 bit digital message that identifies the bridge and cell being addressed and provides a direction for either skipping or not skipping a cell-conducting cycle. After 216, or if the average cell current is less than or equal to the fair share current at 214, the same process is repeated for each cell (e.g., AP,BP,CP,AN,BN,CN) in a bridge, at 218 and 220, and then, at 222 and 224, the pointer is set to the next bridge (e.g., 22) to repeat the process until a skip firing code is generated for all the cells in all the bridges.

Finally, at 226, the skip firing codes are communicated to the BFCs 42,44 over the communication bus 58. The skip firing code also identifies the number of cycles to be skipped. The microprocessors (not shown) in the BFCs 42,44 decipher the skip firing code and identify the cell being directed to skip a cycle. The BFC then sets a counter corresponding to the cell being addressed which counts down at the appropriate cycle to be skipped. For example, if the skip firing code directed the particular cell to skip every thirty-second cycle, then the counter, for example, would be set to 31 and would be decremented a step down each firing cycle until, at zero count, its corresponding SCR would skip the corresponding cycle. After each skip, the exemplary counter would be reset to skip the next exemplary thirty-second cycle.

As previously mentioned, when a small number of bridges are connected in parallel, it is desirable not to have two bridges skip-firing at the same time. If there were a large number of bridges in the system, then the current output could tolerate more than one bridge skipping, so long as it was a relatively small number. To assure more bridges don't simultaneously skip a given cycle than is permissible, the skip firing code identifies the bridge, or bridges, if any, that are being directed to skip firing. Even though a counter associated with a particular SCR may count down in a given cycle, the corresponding cell will not skip firing unless directed by the skip firing code corresponding to that cycle. Nevertheless, upon counting down, the counter will be reset and repeat its counting cycle. In the event the counts down without the corresponding SCR skip-firing, the BFC 42 sets a flag which directs the cell to skip a firing cycle the next time the skip firing code identifies that cell is to skip a cycle, regardless of the count on the cells corresponding counter. In this way, the proper number of cycles are skipped without more than the proper number of cells skipping a cycle at the same time.

In one embodiment, the EFC 46 determines the number of cycles skipped for a cell by the amount the cell current, Icell, is greater than the fair share cell current, Ifs. In another embodiment, the EFC 46 directs the BFC to skip a given number of cycles regardless of the difference between the cell current and the fair share cell current so long as the cell current exceeds the fair share cell current by a predetermined amount. If subsequent analysis identifies that the same cell current still exceeds the fair share cell current, then the EFC 46 directs the BFC to increase the number of cycles in a given period skipped for that cell. In this way, the balance in the individual cells can be adjusted so that corresponding cells of the bridges pass substantially the desired amounts of current. As previously described, a similar procedure can be employed for delaying or advancing the firing of individual cells for the same purpose.

The present invention has substantial benefit in determining the average cell currents for the segments of a controlled bridge rectifier and, in particular, the average cell currents for the segments in a parallel array system. The average cell currents, in turn, may be advantageously employed for display and to balance currents among the individual segments of a parallel bridge system to provide a higher quality DC output.

The present invention reduces the count of sensors needed to determine average cell currents and, also, permits various sensors, including simpler conduction monitors, to be employed for determining whether any segment is conducting.

While for clarity of disclosure reference has been made herein to the exemplary display step 207 for displaying average current values, it will be appreciated that such values may be stored, printed on hard copy, computer modified, or combined with other data. All such processing shall be deemed to fall within the terms "display" or "displaying" as employed herein.

While specific embodiments of the invention have been described in detail, it will be appreciated by those skilled in the art, that various modifications and alternatives to those details could be developed in light of the overall teachings of the disclosure. Accordingly, the particular arrangements disclosed are meant to be illustrative only, and not limiting as to the scope of invention which is to be given the full breadth of the claims appended and any and all equivalence thereof.

What is claimed is:

1. A controlled rectifier bridge for converting alternating current to direct current, said alternating current having a plurality of phases each of which has a positive polarity and a negative polarity, said bridge comprising:

a segment for each of said positive and negative polarities of each of said phases of said alternating current, each of said segments having an element responsive to a control signal to control current conduction within said segment;

a monitor for each of said phases of said alternating current, each of said monitors monitoring a corresponding one of said phases to provide a conduction signal;

a first current sensor sensing current of said segments for said positive polarity of said phases of said alternating current, said first current sensor providing a first current signal;

a second current sensor sensing current of said segments for said negative polarity of said phases of said alternating current, said second current sensor providing a second current signal;

means for outputting the control signals to said segments to control current conduction within said segments; and means employing said conduction signals and said first and second current signals for determining an average current for each of said segments.

2. The controlled rectifier bridge of claim 1 wherein said means for determining an average current includes:

means for determining whether any of said segments is open; and means for zeroing the average current of any of said segments which are determined to be open.

3. The controlled rectifier bridge of claim 1 wherein said means for determining an average current includes:

means for determining whether only one of said segments for said positive polarity of said alternating current is conducting;

means employing the first current signal for updating the average current of said only one of said segments for said positive polarity of said alternating current which is determined to be conducting;

means for determining whether only one of said segments for said negative polarity of said alternating current is conducting; and means employing the second current signal for updating the average current of said only one of said segments for said negative polarity of said alternating current which is determined to be conducting.

4. The controlled rectifier bridge of claim 3 wherein said average current includes an old value and a new value; and wherein said means employing the first current signal includes:

means for subtracting the old value from the first current signal to provide a difference value;

means for multiplying the difference value times a gain value to provide an adjustment value; and means for adding the adjustment value to the old value to provide the new value of said average current.

5. The controlled rectifier bridge of claim 3 wherein said average current includes an old value and a new value; wherein said means for outputting the control signals to said segments outputs one of said control signals two consecutive times to one of said segments to control current conduction within said one of said segments; and wherein said means for determining an average current includes:

means cooperating with said means for outputting the control signals to determine if said one of said segments is not conducting after said one of said control signals has been output the second time; and means for adjusting said average current value of said one of said segments when said one of said segments is not conducting after said one of said control signals has been output the second time, said means for adjusting said average current value including:

means for subtracting the old value from zero to provide a difference value;

means for multiplying the difference value times a gain value to provide an adjustment value; and means for adding the adjustment value to the old value to provide the new value of said average current.

6. The controlled rectifier bridge of claim 1 wherein said phases include three phases; and wherein said controlled rectifier bridge is a three-phase rectifier.

7. The controlled rectifier bridge of claim 6 wherein said segments include six segments; wherein said monitor for each of said phases of said alternating current includes three monitors which provide three conduction signals; and wherein said means for determining an average current provides an average current for each of said six segments from the three conduction signals, and said first and second current signals.

8. The controlled rectifier bridge of claim 1 wherein the elements are semiconductor controlled rectifiers.

9. The controlled rectifier bridge of claim 1 wherein each of said monitors is a conduction monitor; and wherein said conduction signal is a logic signal having a first state representative of the positive polarity of said alternating current, and having a second state representative of the negative polarity of said alternating current.

10. The controlled rectifier bridge of claim 1 wherein each of said monitors is a current sensing mechanism; and wherein the first state of said conduction signal has a range of values representative of the positive polarity of said alternating current, and the second state of said conduction signal has a range of values representative of the negative polarity of said alternating current.

11. A system for converting alternating current to direct current, said alternating current having a plurality of phases each of which has a positive polarity and a negative polarity, said system comprising:

a plurality of controlled rectifier bridges each of which comprises:

a segment for each of said positive and negative polarities of each of said phases of said alternating current, each of said segments having an element responsive to a control signal to control current conduction within said segment, a monitor for each of said phases of said alternating current, each of said monitors monitoring a corresponding one of said phases to provide a conduction signal, a first current sensor sensing current of said segments for said positive polarity of said phases of said alternating current, said first current sensor providing a first current signal, a second current sensor sensing current of said segments for said negative polarity of said phases of said alternating current, said second current sensor providing a second current signal, means for outputting the control signals to said segments to control current conduction within said segments, and means employing said conduction signals and said first and second current signals for determining an average current for each of said segments; and a central control circuit to control said rectifier bridges.

12. The system of claim 11 wherein said means for determining an average current includes:

means for determining whether any of said segments is open; and means for zeroing the average current of any of said segments which are determined to be open.

13. The system of claim 11 wherein said means for determining an average current includes:

means for determining whether only one of said segments for said positive polarity of said alternating current is conducting;

means employing the first current signal for updating the average current of said only one of said segments for said positive polarity of said alternating current that is conducting;

means for determining whether only one of said segments for said negative polarity of said alternating current is conducting; and means employing the second current signal for updating the average current of said only one of said segments for said negative polarity of said alternating current that is conducting.

14. The system of claim 13 wherein said average current includes an old value and a new value; and wherein said means employing the first current signal includes:

means for subtracting the old value from the first current signal to provide a difference value;

means for multiplying the difference value times a gain value to provide an adjustment value; and means for adding the adjustment value to the old value to provide the new value of said average current.

15. The system of claim 13 wherein said average current includes an old value and a new value; wherein said means for outputting the control signals to said segments outputs one of said control signals two consecutive times to one of said segments to control current conduction within said one of said segments; and wherein said means for determining an average current includes:

means cooperating with said means for outputting the control signals to determine if said one of said segments is not conducting after said one of said control signals has been output the second time; and means for adjusting said average current value of said one of said segments when said one of said segments is not conducting after said one of said control signals has been output the second time, said means for adjusting said average current value including:

means for subtracting the old value from zero to provide a difference value;

means for multiplying the difference value times a gain value to provide an adjustment value; and means for adding the adjustment value to the old value to provide the new value of said average current.

16. The system of claim 15 wherein each of the conduction signals corresponds to a pair of said control signals and has a first state representative of the positive polarity of said alternating current and a second state representative of the negative polarity of said alternating current; wherein said means for outputting the control signals to said segments outputs said control signals as a plurality of digital logic signals each of which controls current conduction within a corresponding one said segments and outputs said digital logic signals two consecutive times to provide first and second sets of said digital logic signals; and wherein said means cooperating with said means for outputting the control signals includes:

means for comparing the first and second sets of said digital logic signals to determine which of said control signals has been output the second time; and means for determining whether the conduction signal which corresponds to said control signal which has been output the second time is in one of the first and second states in order to determine that said one of said segments is not conducting.

17. The system of claim 11 wherein the elements are semiconductor controlled rectifiers.

18. The system of claim 11 wherein said means for determining an average current includes means for communicating said average currents to said central control circuit; and wherein said central control circuit includes means for receiving said average currents and means for displaying said average currents.

19. The system of claim 11 wherein each of said means for determining an average current includes means for communicating said average currents to said central control circuit;

said central control circuit includes:

means for receiving said average currents from each of said controlled rectifier bridges, means for detecting an imbalance in current among corresponding segments of said controlled rectifier bridges, and means for communicating a control message, upon detecting said imbalance, to one of said means for outputting the control signals to said segments to establish a balance of current among the corresponding segments; and each of said means for outputting the control signals includes means for receiving said control message and for adjusting current conduction in one of the elements which exhibits said imbalance in order to bring the segments into balance.

* * * * *